Patented Aug. 8, 1939

2,168,847

UNITED STATES PATENT OFFICE 2,168,847

THIOAMIDES AND PROCESSES OF PREPARING THE SAME

Anderson W. Ralston, Chicago, Ill., assignor to Armour and Company, Chicago, Ill., a corporation of Illinois No Drawing. Application July 9, 1936, Serial No. 89,851

19 Claims. (Cl. 260—399)

This invention relates to processes of preparing aliphatic thioamides and it comprises processes wherein an aliphatic nitrile containing six or more carbon atoms in the alkyl radical is reacted with sulfur and an ammonium sulfide, advantageously in the presence of an inert non-aqueous solvent; it further comprises processes wherein the nitrile is dissolved in such a solvent, sulfur added thereto, the solution saturated with ammonia and with hydrogen sulfide, and the mixture heated; and it further comprises, as new materials, aliphatic thioamides wherein the alkyl group contains at least six carbon atoms.

The lower molecular weight thioamides such as thiacetamide are substances of some technical interest in the arts since from them various sulfur-containing derivatives of value can be prepared. One method of making these compounds consists in reacting a nitrile with hydrogen sulfide. This reaction is analogous to the conversion of the nitriles to their amides by reaction with water. So far as I am aware the thioamides of higher molecular weight, namely those containing six or more carbon atoms in the alkyl radical, have not hitherto been prepared. This has been due to difficulties in reacting hydrogen sulfide with the higher aliphatic nitriles, such as caprilonitrile, lauronitrile, tridecylonitrile, myristonitrile, palmitonitrile, and stearonitrile. Hydrogen sulfide is not a particularly reactive agent for the conversion of even the lower molecular weight nitriles to their corresponding thioamides. The reaction is not nearly as satisfactory as the conversion of the nitriles to their corresponding acid amides by the action of hydrolytic agents.

The thioamides of higher molecular weight, and by that I mean those containing at least six carbon atoms in the alkyl radical, would be advantageous materials of technical importance in the arts for preparing a vast number of chemical compounds containing alkyl groups having a relatively large number of carbon atoms. They are also useful as accelerators in the vulcanization of rubber, as anti-foaming compounds, as insecticides and fungicides, and as addition agents to be added to lubricating oils, this use being more specifically described and claimed in my copending application Serial No. 93,313 filed July 29, 1936. Since such thioamides have not, to my knowledge, been hitherto prepared, I have set myself to the problem of developing satisfactory methods of making these substances.

Since the simple treatment with hydrogen sulfide is ineffective for converting the higher nitriles to thioamides, I have been obliged to discover other ways. I have discovered that the higher fatty acid nitriles, such as those listed above, can be converted to thioamides with high yields and very little side reactions when the nitrile is reacted with sulfur and an ammonium sulfide. In actual practice, I prepare the ammonium sulfide within the reaction mixture by saturating the mixture with ammonia and then with hydrogen sulfide. Advantageously, the reaction is conducted in the presence of an inert non-aqueous solvent. I find that very much better results are obtained when the presence of water in the reaction is avoided.

In broadest aspects then, my invention comprises the treatment of the higher aliphatic nitriles with free sulfur in the presence of ammonium and hydrogen sulfide which most probably yields an ammonium sulfide.

Any aliphatic nitrile containing six or more carbon atoms can be used in my process and I shall not describe treatment of all of these nitriles. I have given a representative list of them above. My invention can be understood from a description of the conversion of stearonitrile to its corresponding thioamide. Ten parts by weight of stearonitrile, $C_{17}H_{35}CN$, are dissolved in about 150 parts by weight of absolute ethyl alcohol or other non-aqueous inert solvent for the nitrile which will also dissolve ammonia. To the solution I add about one part by weight of free sulfur, such as flowers of sulfur and then saturate the mixture with dry ammonium gas and with dry hydrogen sulfide gas. These two constituents are bubbled into the reaction solution until the solution appears to be fully saturated with respect thereto. The mixture is then heated in a bomb for about two hours at a temperature of about 215° C. This temperature can vary over fairly wide limits, of about 175°–250° C. Temperature is only used to speed up the reaction, and when dealing with nitriles having six to ten carbon atoms in the alkyl group, I can operate at somewhat lower temperatures. The reaction time will, of course, be governed by the size of the apparatus, quantity of substances used and similar factors.

After the heating period the reaction mixture is withdrawn from the bomb or autoclave, excess sulfur filtered off and the filtrate cooled to a temperature somewhat below freezing by means of a mixture of ice and salt. This results in the crystallization of the thioamide, the yield amounting to about 8.4 parts by weight. Based on the quantity of stearo-nitrile, this is a yield of almost 85 percent. The compound, namely heptadecyl thioamide, can be recrystallized from alcohol and has a melting point of 97° to 98° C.

Instead of using gaseous ammonia and hydrogen sulfied, I can saturate absolute alcohol, for example, with ammonia and hydrogen sulfide to form ammonium sulfide therein most probably, and then add this saturated solution to a solution of the nitrile dissolved in a further quantity of solvent to which a small amount of sulfur has been added. The use of ammonium and hydrogen sulfide, together with sulfur probably results in the formation of a polysulfide although what actually happens is not clear. Dry ammonium and dry hydrogen sulfide are introduced into the reaction mixture so as to insure the substantial absence of any moisture.

When converting other nitriles, such as caprilo, to its corresponding thioamide, I proceed in exactly the same way and observe about the proportions of free sulfur to nitrile stated above. An excess of sulfur does no harm since the excess can be recovered by filtering the reaction product.

Having thus described my invention what I claim is:

1. An aliphatic thioamide having the structural formula RCSNH$_2$ wherein R is an alkyl radical having at least six carbon atoms in the carbon chain thereof.

2. An aliphatic thioamide having the structural formula RCSNH$_2$ wherein R is a heptadecyl radical.

3. The process of preparing aliphatic thioamides which comprises reacting an unsubstituted alkyl nitrile having at least six carbon atoms in the alkyl radical with sulfur and an ammonium sulfide.

4. The process of preparing an aliphatic thioamide which comprises reacting an unsubstituted alkyl nitrile having at least six carbon atoms in the alkyl radical with sulfur, and an ammonium sulfide in the presence of a non-aqueous inert solvent.

5. The process of preparing an aliphatic thioamide which comprises reacting an unsubstituted alkyl nitrile having at least six carbon atoms in the alkyl radical with sulfur and an ammonium sulfide in the presence of absolute ethyl alcohol.

6. The process of preparing an aliphatic thioamide which comprises reacting an unsubstituted alkyl nitrile having at least six carbon atoms in the alkyl radical with sulfur and an ammonium sulfide in the presence of an inert non-aqueous solvent at a temperature of about 200°–250° C.

7. The process as in claim 6 wherein the solvent is absolute ethyl alcohol.

8. The process of preparing an aliphatic thioamide which comprises adding sulfur to a non-aqueous solution of an unsubstituted aliphatic nitrile containing at least six carbon atoms in the alkyl radical, saturating the solution with dry ammonia and with hydrogen sulfide, and heating the mixture to an elevated reaction temperature.

9. The process as in claim 8 wherein the solvent is absolute ethyl alcohol.

10. The process as in claim 8 wherein the temperature is about 200°–250° C.

11. The process as in claim 8 wherein the nitrile is stearonitrile.

12. The process of preparing heptadecyl thioamide which comprises dissolving stearonitrile in a non-aqueous solvent therefor, adding sulfur to the solution, saturating the solution with ammonia and hydrogen sulfide, and heating the saturated solution at a temperature of about 200° C. to about 250° C.

13. The process as in claim 12 wherein the solvent is absolute ethyl alcohol.

14. The process as in claim 3 wherein the nitrile is stearonitrile.

15. The process as in claim 4 wherein the nitrile is stearonitrile.

16. The process of preparing an aliphatic thioamide which comprises saturating a non-aqueous solution of an aliphatic nitrile containing at least six carbon atoms in the alkyl radical, with dry ammonia and with hydrogen sulfide.

17. Thiolauramide.

18. A thioamide of the formula R—CS—NH$_2$ wherein R is an open chain hydrocarbon radical of at least eleven carbon atoms.

19. A thioamide of the formula R—CS—NH$_2$ wherein R is a saturated straight chain hydrocarbon radical of at least eleven carbon atoms.

ANDERSON W. RALSTON.